No. 611,749. Patented Oct. 4, 1898.
J. B. DAVIS.
ANIMAL TRAP.
(Application filed Oct. 15, 1897.)
(No Model.)

Inventor
John B. Davis.

Witnesses
J. Grant Culverwell,
Edwin Cruse.

By his Attorneys,
C. A. Snow & Co.

THE NORRIS PETERS CO., PHOTO-LITHO., WASHINGTON, D. C.

UNITED STATES PATENT OFFICE.

JOHN B. DAVIS, OF ABINGDON, ILLINOIS.

ANIMAL-TRAP.

SPECIFICATION forming part of Letters Patent No. 611,749, dated October 4, 1898.

Application filed October 15, 1897. Serial No. 655,295. (No model.)

*To all whom it may concern:*

Be it known that I, JOHN B. DAVIS, a citizen of the United States, residing at Abingdon, in the county of Knox and State of Illinois, have invented a new and useful Animal-Trap, of which the following is a specification.

This invention relates to animal-traps especially designed to catch mice, rats, or other rodents; and the object of the invention is to provide a simple and efficient device of this character which may be manufactured at a low cost, that can be easily set without danger to the operator's fingers, and will not readily get out of order.

With these objects in view the invention consists of the several details of construction and combination of parts, as will be hereinafter fully described, and particularly pointed out in the claims.

Figure 1:
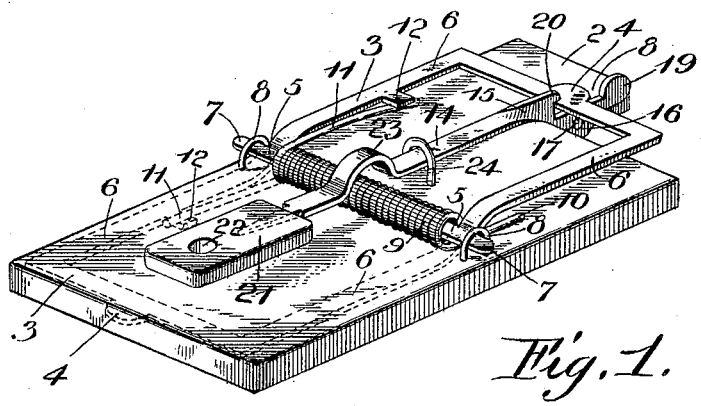
Figure 2:
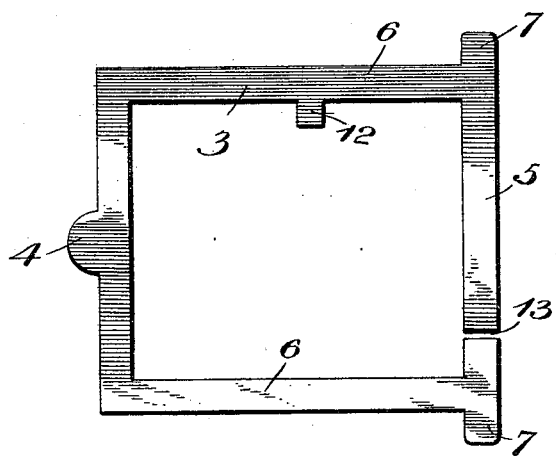
Figure 3:
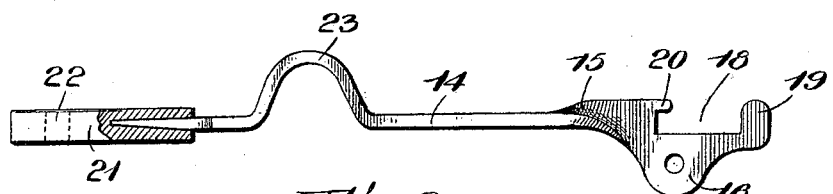

In the drawings, Figure 1 is a perspective view of a trap made in accordance with my invention, the jaw being shown in full lines in its set position and in dotted lines in the position it occupies when the trap is sprung. Fig. 2 is a plan view of the jaw detached. Fig. 3 is a side elevation of the tripping-lever detached, the bait-holder being partly broken away.

Similar reference-numerals indicate similar parts in the several figures.

1 indicates the base, which may be of wood or other suitable material and is provided with an offset 2 at its rear end.

3 indicates the jaw, which is in the form of a rectangular skeleton frame and preferably made from sheet-steel or other suitable metal, although it may be of wire, if preferred. A finger-hold 4 is provided on the front bar of the jaw, which projects beyond the front edge of the base. The rear bar 5 of the jaw extends at each end beyond the side bar 6 to form pivots 7 for the jaw, and these pivots work in staples 8, secured in the base.

9 indicates a coiled spring fitted around the rear bar 5 of the jaw, and one end 10 of this spring is secured to the base, in rear of the jaw, and the other end 11 extends forward and loosely engages a lug 12, which projects inwardly from one of the side bars 6. In order to facilitate putting the spring on the rear bar, I divide the bar transversely near the end remote from the side bar with which the spring engages, as indicated at 13, and the long portion of the bar can be easily sprung aside to permit the spring to be fitted over it, and when the spring is secured to the base the opening or dividing cut will be entirely hidden. The spring will be somewhat shorter than the bar to permit the necessary endwise movement of the spring.

14 indicates the tripping-lever, which may be of any suitable material, preferably a flat bar, and this bar is given a half-twist near its rear end, as indicated at 15, to bring the edges of its rear end portion at a right angle to the edges of the remaining portion. The rear end portion is widened to form a downwardly-extending ear 16, which is perforated for the passage of a pivot-pin 17 into the longitudinal edge of the offset 2. Immediately above the pivot a recess 18 is formed in the upper edge of the lever of sufficient length to receive the front bar and finger-piece 4, and the extreme end of the lever is in the form of a knob, as indicated at 19, to afford a convenient projection to rock the lever when setting the trap. The front vertical wall of the recess is provided with an overhanging lip or projection 20, adapted to engage the front bar and hold the jaw against the force of the spring when the trap is set.

The front end of the lever will preferably be pointed in order to insert it in the bait-holder 21, which will preferably be of wood and provided with an opening 22 for the reception of bait. The bait-holder may, however, be secured to the lever in any other manner, if preferred. In order to permit the lever and the bait-holder to be in engagement with the base when the trap is sprung, the lever is provided with an upwardly-extending loop 23, which fits over the spring 9. A guide-staple 24 straddles the lever in rear of the spring and is secured in the base, and this staple will prevent undue lateral movement of the lever.

In order to set the trap, the operator will grasp the finger-piece 4 and pull the jaw over against the force of the spring, and a slight pressure on the knob at the end of the lever will rock the latter on its pivot and cause the lip 20 to engage the jaw and hold it against the force of the spring. The trap can thus be set without any risk of the operator getting his fingers caught between the jaw and the base.

A trap made in accordance with my invention is exceedingly sensitive and will be tripped by the animal if the latter touches the lever at any point in advance of the pivot. It is also obvious that traps made in accordance with my invention can be manufactured at a very low cost, and as the lever lies close against the base the traps can be packed in very small compass for transportation.

It will be understood that changes in the form, proportion, and the minor details of construction may be resorted to without departing from the spirit or sacrificing any of the advantages of this invention.

Having thus described the invention, what I claim is—

1. An animal-trap, comprising a base, a pivoted jaw, an actuating coiled spring, and a tripping-lever, said jaw being in the form of an open skeleton frame having a straight rear bar pivotally connected to the base, and being transversely divided near one end to permit the coiled spring to be fitted endwise onto said bar, substantially as described.

2. A jaw for an animal-trap formed from sheet spring metal, in the form of an open skeleton frame having a straight rear bar adapted to be pivoted on a base, said bar being divided transversely near one of the side bars to form a long and a short section, combined with an actuating coiled spring, normally of greater length than the longest section, said spring being compressible lengthwise to permit it to be fitted endwise onto the said longest section, and when expanded to cover the dividing cut, substantially as described.

3. An animal-trap, comprising a base, a pivoted tripping-lever having a bait-holder at its front end and a locking lip or projection at its rear end, a jaw in the form of a skeleton frame having a straight rear bar pivotally connected to the base, said jaw having an inwardly-projecting lug on one of its side bars, and a coiled spring surrounding the rear bar and having one of its ends secured in the base and its other end loosely engaging the lug on the side bar, said rear bar being transversely divided near its end remote from the side having the lug to permit the spring to be fitted endwise thereon, substantially as described.

4. An animal-trap, comprising a base, a pivoted tripping-lever having a bait-holder at its front end, a jaw in the form of a skeleton frame having a projecting finger-piece on its front end, an inwardly-projecting lug on one of its side bars, and its rear bar being extended beyond the side bars to form pivots, a coiled spring on the rear bar having one of its ends secured to the base and its other end loosely engaging the lug on the side bar, and devices secured to the base and embracing the pivots, the rear bar of the frame being divided transversely to permit the coiled spring to be fitted endwise thereon, substantially as described.

In testimony that I claim the foregoing as my own I have hereto affixed my signature in the presence of two witnesses.

JOHN B. DAVIS.

Witnesses:
  G. E. WILLIAMSON,
  S. T. MOSSER.